United States Patent
Lan

(10) Patent No.: US 7,558,606 B2
(45) Date of Patent: Jul. 7, 2009

(54) MOBILE PHONE WITH AN INDICATING FUNCTION AND METHOD FOR OPERATING THE MOBILE PHONE TO PROVIDE THE INDICATING FUNCTION

(75) Inventor: Sen-Hao Lan, Taipei (TW)

(73) Assignee: AsusTek Corporation, Inc., Taipei (TW)

( * ) Notice: Subject to any disclaimer, the term of this patent is extended or adjusted under 35 U.S.C. 154(b) by 552 days.

(21) Appl. No.: 11/289,285

(22) Filed: Nov. 30, 2005

(65) Prior Publication Data

US 2006/0287012 A1 Dec. 21, 2006

(30) Foreign Application Priority Data

Jun. 21, 2005 (TW) .............................. 94120656 A

(51) Int. Cl.
*H04M 1/00* (2006.01)
(52) U.S. Cl. .............. 455/575.1; 455/550.1; 455/556.1; 455/566
(58) Field of Classification Search ................ 455/411, 455/550.1, 566, 575.1, 575.7, 90.3
See application file for complete search history.

(56) References Cited

U.S. PATENT DOCUMENTS 5,956,633 A * 9/1999 Janhila ........................ 455/410
6,215,984 B1 * 4/2001 Figueras et al. .......... 455/575.7
6,490,439 B1 * 12/2002 Croft et al. .................. 455/90.1
2004/0085351 A1 * 5/2004 Tokkonen .................... 345/741
2006/0025110 A1 * 2/2006 Liu .............................. 455/411

FOREIGN PATENT DOCUMENTS

| KR | 2002-0050773 | 6/2002 |
|---|---|---|
| KR | 10-2004-0026806 | 4/2004 |
| TW | 425036 | 7/1999 |

\* cited by examiner

*Primary Examiner*—Temica M Beamer
(74) *Attorney, Agent, or Firm*—Bacon & Thomas, PLLC

(57) ABSTRACT

A mobile phone with an indicating function and method of operating the mobile phone to provide an indicating function is disclosed. The mobile phone includes a body, an external antenna, an indicating device and an indication enabling device, wherein the indicating device further includes a light emitting unit configured in the external antenna and a control circuit configured on the body. The indication enabling device is configured on the body and electrically connected to the control circuit so that the control circuit can control the light source unit to illuminate through operating the indication enabling device. Therefore, the user is able to manipulate the user interface shown by the display of the mobile phone to enter a password through the keypad of the body for starting the indicating function.

7 Claims, 4 Drawing Sheets

MOBILE PHONE WITH AN INDICATING FUNCTION AND METHOD FOR OPERATING THE MOBILE PHONE TO PROVIDE THE INDICATING FUNCTION

BACKGROUND OF THE INVENTION

1. Field of the Invention

The present invention relates to a mobile phone and, more particularly, to a mobile phone with an indicating function and method for operating the mobile phone to provide the indicating function.

2. Description of Related Art

With the development of telecommunications technology, mobile phones have become popular electronic products for everyone. Since the mobile phones have many advantages, such as being small size and lightweight, and also providing various external functions, people have become more and more reliant on the use of the mobile phones. Thus, in industrialized nations, almost everyone has a mobile phone.

In many situations, such as conferences or lectures, a speaker usually uses a laser pen capable of projecting a red dot to indicate the presented slides or images, thereby enabling the listeners to easily understand the key points of the speech. However, the laser pen is too small, so the users may easily forget to take it or lose it. As in the foregoing discussion, everyone almost has a mobile phone, so if the laser pen can be integrated into the mobile phone, people can easily operate the laser pen function of the mobile phone without carrying a separate laser pen particularly. Therefore, it is desirable to provide a mobile phone with a laser pen function to mitigate and/or obviate the aforementioned problems.

SUMMARY OF THE INVENTION

An aspect of this invention is to provide a mobile phone with an indicating function. The mobile phone includes a mobile phone body, an external antenna, an indicating device and an indication enabling device. The mobile phone body is configured with a keypad. The external antenna is configured on the mobile phone. The indicating device includes a light emitting unit configured in the external antenna and a control circuit configured in the mobile phone body. The indication enabling device is configured on the mobile phone body and is electrically connected to the control circuit, which is operated to make the control circuit drive the light emitting unit to emit light. The mobile phone further includes a display to show a user interface through which the mobile phone is controlled by operating the keypad to start the indicating device.

Therefore, the mobile phone with indicating function provided by the present invention can provide the indicating function easily during a presentation, seminar, speech or teaching class. Further, it can raise the added-value to the mobile phone by integrating the mobile phone with the indicating function (laser pen function).

In addition, the mobile phone body includes a display to show a user interface so that the user can operate the keypad to input the user password through the user interface before using the indicating device. This design can avoid any possible injury to the eyes of nearby people should the device be misused, such as by children.

Another aspect of this invention is to provide a mobile phone with an indicating function. The mobile phone includes a mobile phone body, an indicating device and an indication enabling device. The mobile phone body is configured with a keypad. The indicating device includes a light emitting unit configured on the side of the mobile phone body and a control circuit configured in the mobile phone body. The indication enabling device is configured on the mobile phone body and electrically connected to the control circuit, which is operated to make the control circuit drive the light emitting unit to emit light. The display shows a user interface through which the mobile phone is controlled by operating the keypad to start the indicating device.

Another aspect of this invention is to provide a method for operating a mobile phone to provide an indicating function, which is applied to the mobile phone with an indicating function, wherein the mobile phone includes a keypad, an indicating device, an indication enabling device, and a display for showing a user interface. The method includes the steps of: using the keypad to manipulate the user interface for opening an indicating device setting menu; using the indicating device setting menu to select and enable the indicating device and input a password; and operating the indication enabling device for using the indicating device if the password is correct.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
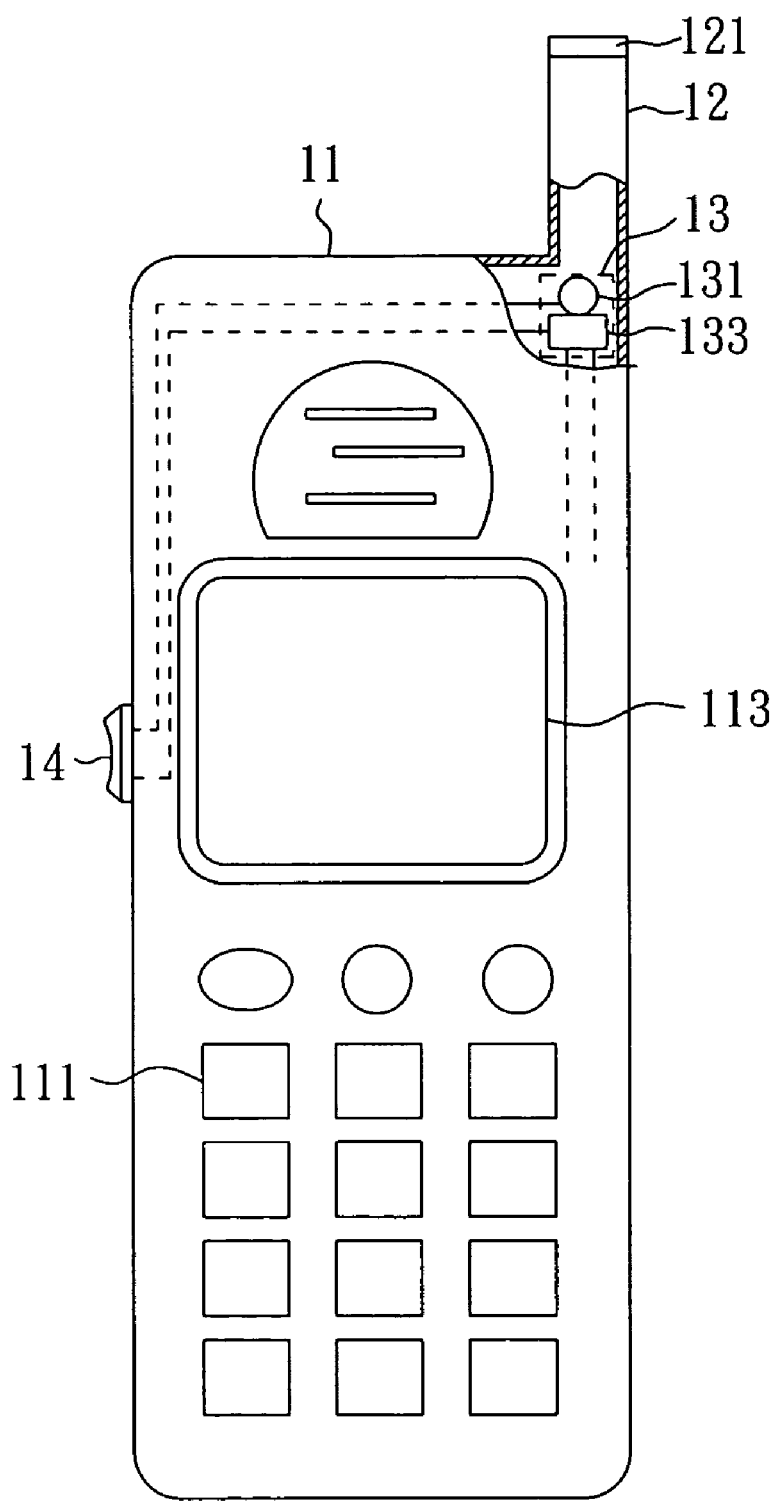
FIG. 1 is a schematic diagram showing one preferred embodiment of the present invention.

With reference to FIG. 1, there is shown a mobile phone with an indicating function in accordance with one preferred embodiment of the present invention, which includes a mobile phone body 11, an external antenna 12, an indicating device 13 and an indication enabling device 14. The mobile phone body 11 further includes a keypad 111 and a display 113. The indicating device 13 further includes a light emitting unit 131 and a control circuit 133.

The external antenna 12 is hollow and configured on the topside of the mobile phone body 11. Further, the external antenna 12 is combined with a transparent unit 121 configured on the top of the external antenna 12.

The light emitting unit 131 of the indicating device 13 is configured in the external antenna 12 and is located at the bottom of the external antenna 12. The control circuit 133 of the indicating device 13 is configured into the mobile phone body 11 and is electrically connected to the light emitting unit 131. Further, the control circuit 133 is electrically connected to the battery of the mobile phone so as to receive the power provided by the battery.

In this embodiment, the light emitting unit 131 can be a laser diode which is capable of emitting a laser beam. The laser beam emitted by the emitting light unit 131 passes through the external antenna 12 and the transparent unit 121 for projecting toward the direction to which the mobile phone points. Therefore, a user can use the mobile phone to easily guide the audiences' attention during a presentation, seminar or teaching class. In addition, in other embodiments, the light emitting unit 131 may be a similar light emitting component capable of emitting a beam.

Generally, the user usually point to the presented slides using a laser pen. In this embodiment of the present invention, the external antenna 12 is a hollow pen-like object, and located on top of the mobile phone body 12. The emitting light unit 131 is configured in the external antenna 12 so that the beam emitted by the light emitting unit 131 can be guided to a specific direction by the external antenna 12. Therefore, when using the mobile phone with the indicating function of the present invention, the user can utilize the external antenna 12 of the mobile phone body 11 to point to the presented slides in compliance with the prior habit as in using the laser pen. In other words, the beam emitted by the light emitting unit 131 is guided through the external antenna 12 to the presented slides.

Next, with reference to FIG. 1 again, the indication enabling device 14 is configured on one side of the mobile phone body 11 and is electrically connected to the control circuit 133 of the indicating device 13. In this embodiment, the indication enabling device 14 is a push button switch which can be mounted on the side of the mobile phone body 11 or on the keypad 111 area. Alternatively, the indication enabling device 14 can be a slide switch or other suitable switch which is preferably configured on the side of the mobile phone body 11.

Since the indication enabling device 14 in accordance with this embodiment is a push button and electrically connected to the control circuit 133 of the indicating device 13, the control circuit 133 receives the power from the battery configured in the mobile phone body 11 when the indication enabling device 14 is pushed. Thereafter, the control circuit 133 controls the light emitting unit 131 to emit light. To the contrary, if the enabling indicating device 14 is released, the control circuit 133 of the indicating device 13 does not receive the power of the battery, and thus the emitting light unit 131 does not emit light.

Therefore, the user can easily operate the indicating device 13 through the indication enabling device 14. However, if there is no protecting function for the mobile phone, children may use the external antenna 12 to point to the eyes of other people so that the beam may cause injury. In other situations, the user may touch the indicating device 14 accidentally so as to enable the indicating function, resulting in power waste. Further, it may hurt the user's eyes or eyes of other people. Therefore, the present invention provides an indicating protection function. Of course, in other embodiments, it can be achieved by pressing various keys to enable the indicating function. For example, similar to releasing the key lock, the user has to first press the '*' key and then press the '#' key to enable the indicating function.

Figure 2:
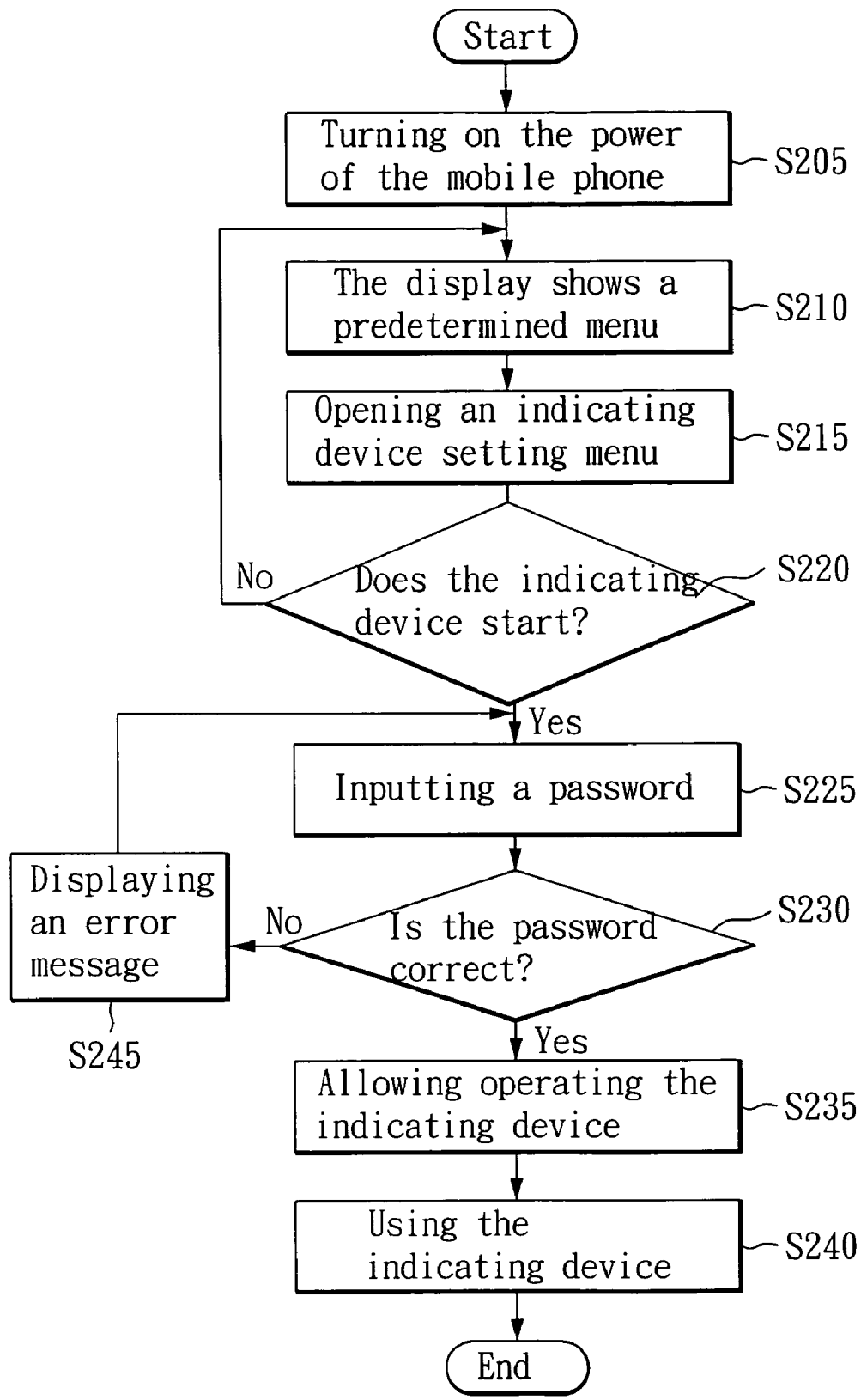
FIG. 2 is a flowchart in accordance with one preferred embodiment of the present invention.
Figure 4C:
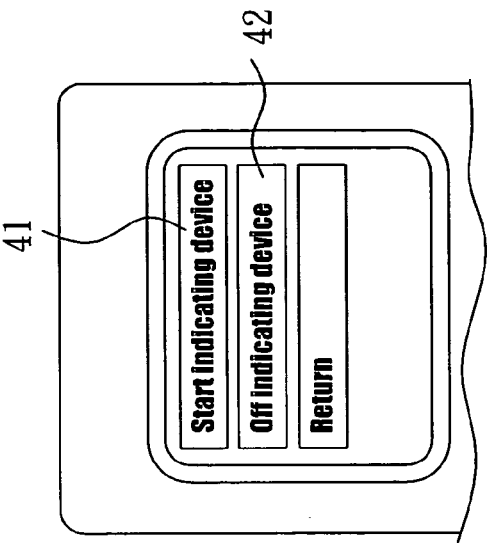
FIGS. 4a to 4e are schematic diagrams corresponding to the operation of the mobile phone in accordance with the preferred embodiment of the present invention.

FIG. 2 shows the flow chart according to the preferred embodiment of the present invention. Please refer to FIG. 2 and FIG. 1 which depict the operation of the mobile phone with indicating function. First, the mobile phone has to be powered on for operation before using the indicating function. Hence, the first step is to turn on the power of the mobile phone (S205). Next, the display 113 of the mobile phone body 11 shows a predetermined menu after the power of the mobile phone is turned on (S210). The predetermined menu, as shown in FIG. 4a, usually includes a background, a name of the telecommunications company, time, signal strength and the status of the battery of the mobile phone.

Figure 4B:
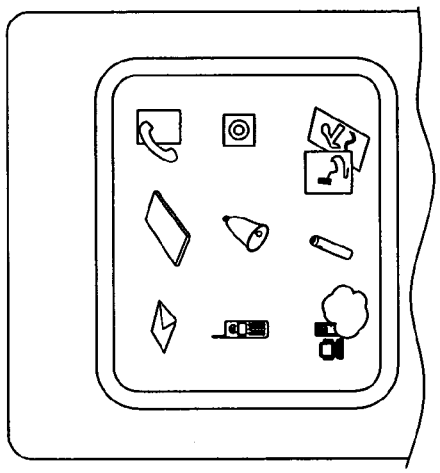
Figure 4A:
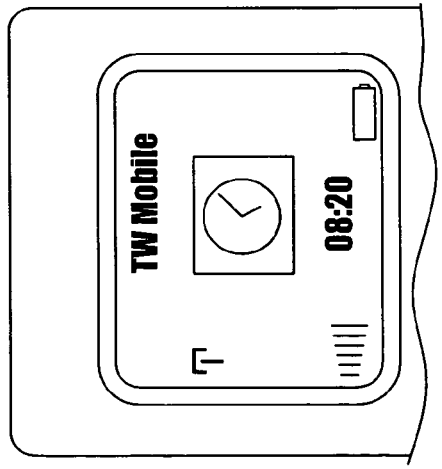

In order to use the indicating device 13, the user has to operate the keypad 111 for opening an indicating device setting menu of a user interface (UI), as show in FIG. 4b, displayed on the display 113 (S215). The indicating device setting menu provides an indicating device 13 enabling icon 41 and an indicating device 13 disabling icon 42, as shown in FIG. 4c. Hence, the user is able to select whether to enable the indicating device 13 or disable the indicating device (S220). If the user operates the keypad 111 through the UI to select the indicating device 13 disablingicon 42, the display 113 shows the predetermined menu. To the contrary, if the user operates the keypad 111 through the UI to select the indicating device 13 enabling icon 41, the display 113 shows a password inputting menu, as shown FIG. 4d.

Figure 3:
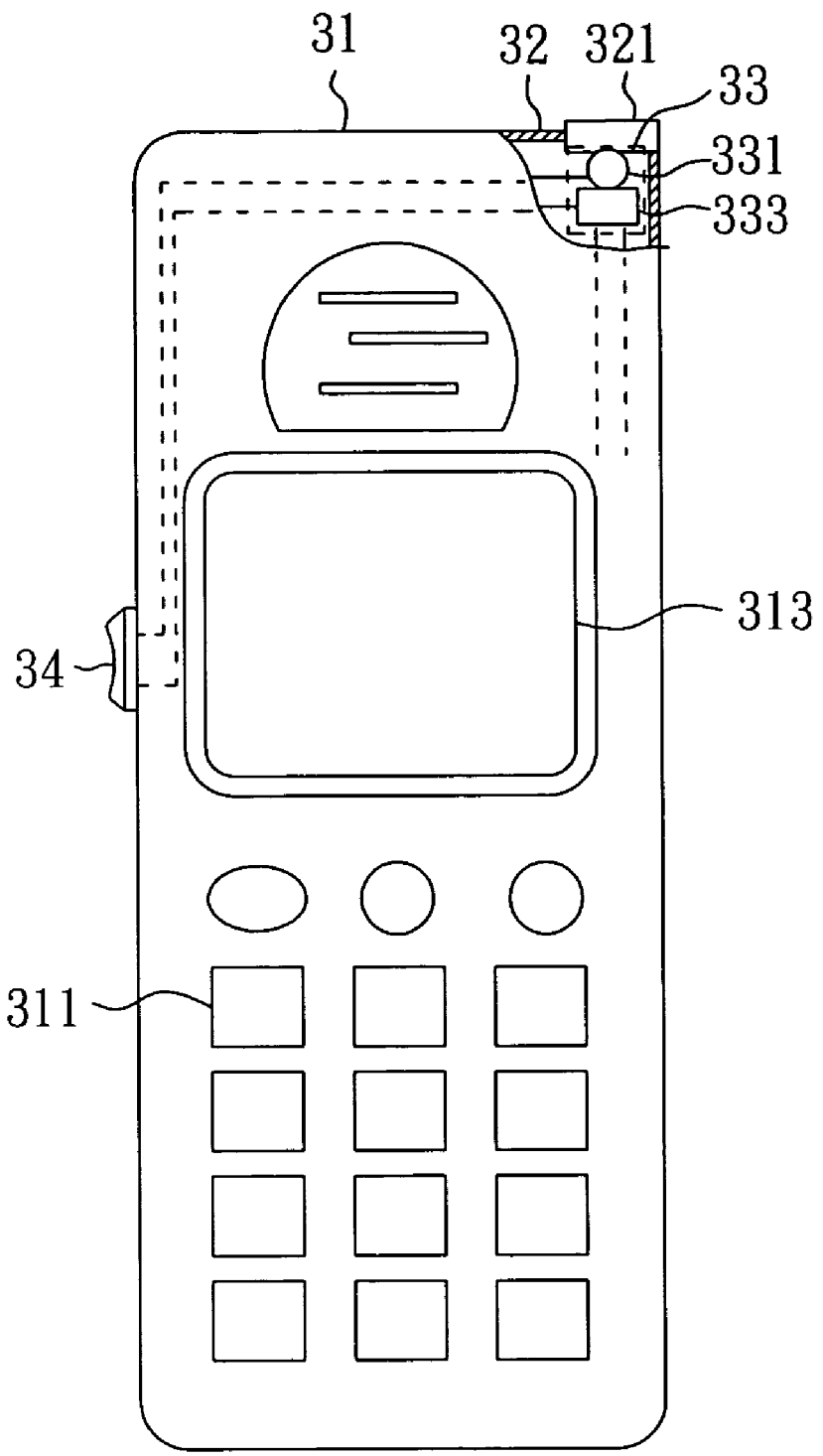
FIG. 3 is a schematic diagram showing another preferred embodiment of the present invention.
Figure 4E:
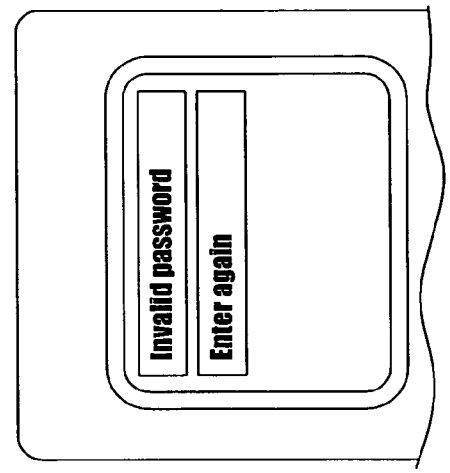
Figure 4D:
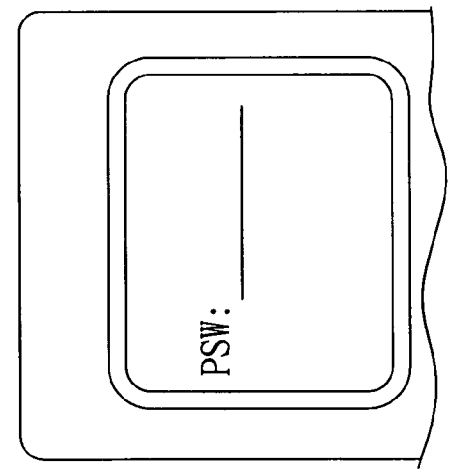

Therefore, the user can input the password at this moment to enable the indicating function so as to activate the indicating device 13 (S225). The software of the mobile phone determines whether the password is correct or not (S230). If the inputted password is incorrect, the display 113 shows an error message, such as 'invalid password', as shown in FIG. 4e (S245). Further, in this embodiment, if the invalid password is inputted three times, the software of the mobile phone controls the display 113 to show the predetermined menu. If the inputted password is correct, the software of the mobile phone starts the indicating function to allow the user to operate the indication enabling device 14 to control the operation of the indicating device (S235). Hence, the user can operate the indicating device 13 through the indication enabling device 14 (S240). FIG. 3 shows a schematic diagram of another embodiment in accordance with the present invention, which includes a mobile phone body 31, an internal antenna 32, an indicating device 33 and an indication enabling device 34. The mobile phone body 31 further includes a keypad 311 and a display 313. The indicating device 33 further includes an emitting light unit 331 and a control circuit 333. The components and the functions of this embodiment are the same as those of the previous one, except that the antenna 32 is configured in the mobile phone body 31 and preferred to be a loop antenna. Besides, the transparent unit 321 is configured on the upper side of the mobile phone body 31 and is placed on top of the light emitting unit 331 for protecting the light emitting unit 331. Alternatively, the transparent unit 321 and the indicating device 33 can be placed on any suitable position of the mobile phone body 31 so as to satisfy the ergonomics requirement and achieve the indicating function.

In view of the foregoing, the present invention provides a mobile phone which has an indicating device to provide an indicating function, wherein the indicating device includes a light emitting unit configured in an external antenna and a control circuit configured into the mobile phone. Further, one side of the mobile phone is configured with an indication enabling device which is operated to use the indicating device. In addition, the present invention further provides an indicating protection function to ask the user to input a password through the keypad configured on the mobile phone before attempting to activate the indicating device. Hence, it can avoid hurting the user's eyes or other's eyes if the user accidentally starts the indicating device, so as to raise the added-value of the mobile phone.

Although the present invention has been explained in relation to its preferred embodiment, it is to be understood that many other possible modifications and variations can be made without departing from the spirit and scope of the invention as hereinafter claimed.

What is claimed is:

1. A mobile phone with an indicating function comprising:
a mobile phone body including a keypad and a display;
an external antenna configured on the mobile phone body;

an indicating device including a light emitting unit configured in the external antenna and a control circuit configured in the mobile phone body; and an indication enabling device configured on the mobile phone body and electrically connected to the control circuit, which is operated to make the control circuit drive the light emitting unit to emit light, wherein the display shows a user interface, and the mobile phone is controlled through the user interface so that the keypad is operated to start the indicating device, and wherein a password is inputted through the keypad before the indicating device can be used.

2. The mobile phone as claimed in claim 1, wherein the external antenna is hollow to contain the light emitting unit.

3. The mobile phone as claimed in claim 1, wherein the external antenna is combined with a transparent unit configured on top of the external antenna.

4. The mobile phone as claimed in claim 1, wherein the indication enabling device is a push button.

5. A mobile phone with an indicating function comprising:

a mobile phone body including a keypad and a display;

an indicating device including:

a light emitting unit configured on the mobile phone body; and a control circuit configured in the mobile phone body; and an indication enabling device configured on the mobile phone body and electrically connected to the control circuit, which is operated to make the control circuit drive the light emitting unit to emit light;

wherein the display shows a user interface, and the mobile phone is controlled through the user interface so that the keypad is operated to start the indicating device, and wherein a password is inputted through the keypad before the indicating device can be used.

6. A method for operating a mobile phone to provide an indicating function, wherein the mobile phone includes an indicating device, and a display for showing a user interface, the method comprising the steps of:

providing an indicating device setting menu in the user interface;

receiving a password through the indicating device setting menu; and activating the indicating device if the password is correct, wherein the display shows an error message if the inputted password is incorrect, and wherein the indicating device cannot be used if the password is not received through the indicating device setting menu.

7. The method as claimed in claim 6, wherein the indicating device setting menu has an icon for closing the indicating device.

* * * * *